United States Patent
Kuwabara et al.

[15] 3,648,212
[45] Mar. 7, 1972

[54] BREAKING RESISTOR WITH COOLING MEANS

[72] Inventors: Takeo Kuwabara; Kazumi Morimoto; Hachiro Miyao, all of Yokohama-shi, Japan

[73] Assignee: Tokyo Shibaura Electric Co., Ltd.

[22] Filed: Sept. 26, 1968

[21] Appl. No.: 762,763

[52] U.S. Cl. ..................................338/53, 176/38, 317/26, 338/55, 338/57, 338/58
[51] Int. Cl. ...........................................................H01c 1/08
[58] Field of Search ..................................338/53, 55, 57, 58

[56] References Cited

UNITED STATES PATENTS 2,147,481  2/1939  Beetlestone et al.......................338/55

Primary Examiner—Rodney D. Bennett, Jr.
Assistant Examiner—R. Kinberg
Attorney—George B. Oujevolk

[57] ABSTRACT

A braking resistor is arranged to be connected to an electric power circuit when the circuit is brought into a light load state as the load becomes disconnected therefrom due to the occurrence of a fault therein. The braking resistor comprises as the unit of a plurality of resistive elements each consisting of a conducting strip or wire wound in the form of a spiral disc, said elements belonging to at least two groups which are distinct from each other with respect to the inner and outer diameters of the elements, these element discs of, for instance, two groups being concentrically spaced in an alternate fashion and said elements being enclosed within an insulating tubular member such that those elements which have greater inner and outer diameters make sealing contact with the tubular member and are spaced from a central carrying means and those elements which have smaller inner and outer diameters are spaced from the tubular member and are sealing relationship with the central carrying means thereby defining an axially folded path for a cooling medium within the tubular member.

11 Claims, 9 Drawing Figures

PATENTED MAR 7 1972

Takeo Kuwabara
Kazumi Morimoto
Hachiro Miyao
INVENTORS

BY
Attorney

BREAKING RESISTOR WITH COOLING MEANS

The present invention relates to apparatus for stabilizing electric power systems, and in particular, to a braking resistive unit which is to be temporarily connected to the electric power circuit that has been rendered into light load state as the load has been disconnected therefrom due to a fault in the system.

In city areas having great electric power demands, electric power is usually supplied from two or more power sources concurrently. When a fault such as a short circuit between two- or three-phase transmission lines and the earth occurs, a circuit breaker located near the point of occurrence of the fault undertakes to break out the fault current, whereby the power system is separated into at least two subsystems.

When the loads connected to the individual subsystems are unbalanced such that stepping out takes place in these subsystems, the frequency of the current through one of the subsystems increases over the rest of the subsystems, thus giving rise to the relative step-out phenomenon.

When such phenomenon once takes place, the synchronous connection of these subsystems requires a long time during which power supply is cut to the great disadvantage.

The fact that in recent years the voltage across the power systems is deemed to have an ever increasing tendency is also presenting serious problems. Particularly, when the voltage is above 500 kilovolts the transient surge voltage as a result of reclosing the system after a fault therein has been eliminated amounts to an enormous value, which dictates significant considerations in the insulation of the system and the resultant economy.

The stabilization of the system is particularly important for nuclear power generation. This is because of the fact that when the operation of the nuclear reactor is once stopped due to a fault in the power system it takes at least several days before resuming the operation of the reactor, during which the supply of the power ceases entirely.

It is proposed to temporarily insert a braking resistor in the system upon the occurrence of a fault in order to avoid the stepping out and the insulation breakdown owing to a surge voltage. As the resistor will be impressed with a very high voltage of the order of over 500 kilovolts, however, its design and construction involve many difficult problems.

One of the problems is that such braking resistors are necessary only when a fault takes place and usually they are out of use, so that large-size expensive ones are uneconomical, nevertheless they should be provided with sufficient insulation against high voltages.

Another problem lies in that together with the small size and inexpensive in cost, large heat capacity and effective cooling of the resistor should also be achieved to ensure against almost instantaneously generated heat of a tremendous magnitude.

The principle object of this invention is to provide a stabilizing means for electric power systems which is small in size and inexpensive in cost.

Another object of the invention is to provide a stabilizer having an effective cooling means.

Still another object of the invention is to provide a stabilizer capable of effectively preventing the stepping out taking place as the result of a fault.

A further object of the invention is to provide a stabilizer which is employed in the field of nuclear power generation to ensure safe continuance of operation of the nuclear reactor without stopping it at the time of occurrence of a fault in the associated power system.

According to the invention the stabilizer consists of a braking resistor comprising a plurality of resistive elements each consisting of a strip or wire of a conducting material closely wound in the form of spiral disc, said elements being of at least two sorts or kinds distinct from one another with respect to their inner and outer diameters, means to carry an alternately spaced arrangement one above another of these kinds of spiral disc elements supported by respective insulating spacers mounted on said means, and a tubular member of an insulating material enclosing said alternate arrangement of the disc-shaped resistive elements, those of said elements which have greater inner and outer diameters being in sealing contact at their outer peripheries with the inner surface of said tubular member and respectively defining an annular gap between their inner peripheries and said carrying means while those of said elements which have smaller inner and outer diameters respectively defining an annular gap between their outer pheripheries and the inner surface of said tubular member and being integral or sealing relationship at their inner peripheries with said carrying means, thereby defining an axially folded path for a cooling medium.

The present invention can be more fully understood from the following detailed description when taken in connection with the accompanying drawings, in which.

Figure 1:
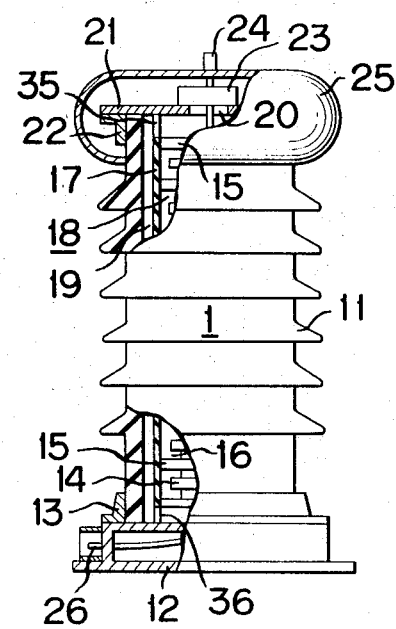
FIG. 1 is a more or less elevational view, partly in section, of a preferred embodiment of the braking resistor according to the invention.

Referring now to the drawings, and particularly, to FIG. 1, the reference numeral generally denotes an insulating casing of a braking resistor 1 according to the invention. The casing 11 is secured to a metal foundation 12 by means of a lower ring bracket 13. Within the casing 11 is concentrically disposed an insulating tubular member 17 enclosing a required number of resistive elements 14 and 15 of two kinds which are distinct from each other with respect to their inner and outer diameters, these elements 14 and 15 of two kinds being alternately arranged one above another at spacers 16 between them which are collectively designated by the reference numeral 18. Each of the resistive elements 14 and 15, whose details are to be described hereinafter, consists of a strip of a conducting material wound in the form of a spiral disc. Accordingly, the resistive element assembly 18 includes alternately, piled resistive spiral discs having different inner and outer diameters. The cylindrical space defined between the casing 11 and the insulating tubular member serves as a flow path of a cooling medium such as air. On top of the casing 11 is placed a lid member 21 having a substantially concentric exit 20 for the cooling medium and secured to the casing 11 through a ring bracket 22. Over the exit 20 is disposed a valve 23 which is opened only when the braking resistor is operated and the casing is formally sealed. The top of the casing 11 is also surrounded by a metal shield 25 provided at its top with a high-tension terminal 24. The high-tension terminal 24 is connected to one end of the uppermost one of the resistive elements 18 which are serially connected to one another and the end of the lowermost element 15 is connected to an earth terminal attached to the foundation 12.

Figure 2:
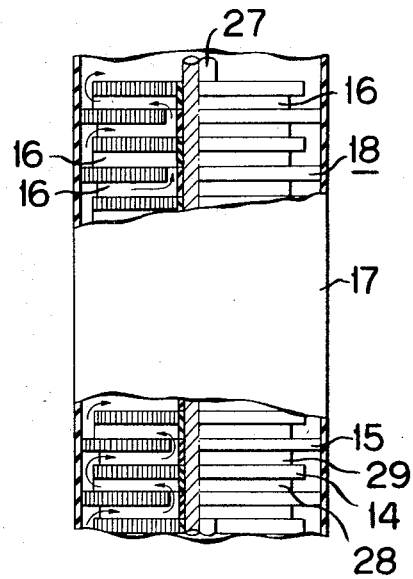
FIG. 2 shows, to an enlarged scale, a portion of the arrangement of the resistive elements of the embodiment of FIG. 1.

As shown in FIG. 2, the assembly 18 of the resistive elements 14 and 15 consists of elemental resistors 14 and 15 supported on respective insulating spacer members 28 and 29 which are alternately mounted one over another on a supporting rod 27 concentrically extending within the insulating tubular member 17. The outer diameter of the resistive element 15 is substantially the same with the inner diameter of the tubular member 14, while the outer diameter of the resistive element 14 is smaller than the inner diameter of the tubular member 17. The cooling medium, for instance air, is injected from the bottom of the tubular member upwards, as indicated by the arrows, while cooling the resistive elements 14 and 15.

Figure 3A:
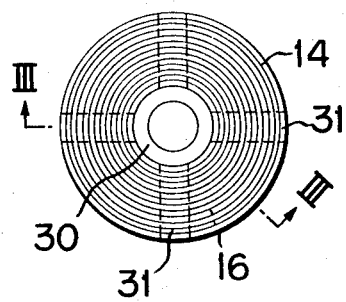
FIG. 3A is a plan view of the resistive element having the smaller inner and outer diameters supported on the associated spacer.
Figure 4A:
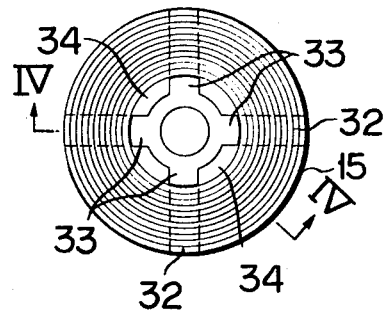
FIG. 4A is a plan view of the resistive element having the greater inner and outer diameters supported on the associated spacer.
Figure 3B:
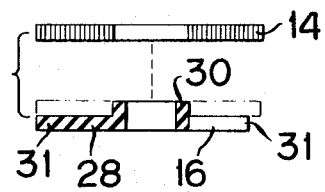
FIG. 3B is an exploded sectional view of the combination of the resistive element and the spacer of FIG. 3A taken along lines III—III and viewed in the direction of the arrows.
Figure 4B:
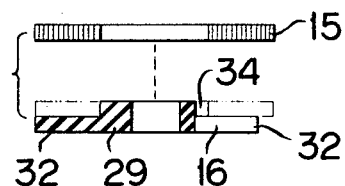
FIG. 4B is an exploded sectional view of the combination of the resistive element and the spacer of FIG. 4A taken along lines IV—IV of viewed in the direction of the arrows.

As shown in FIGS. 3A and 3B, the resistive element 14 is supported on an insulating spacer 28 having a plurality of support arms 31 radially extending from a central ring 30. The resistive element 15 is similarly supported on an insulating spacer 29 having a plurality of support arms 32 radially extending from a central ring 33 as shown in FIGS. 4A and 4B. The resistive elements 15 which have greater inner and outer diameters are in sealing contact at their outer peripheries with the inner surface of the tubular member 17 and are spaced at their inner peripheries from the supporting rod 27. The resistive elements 14 which have smaller inner and outer diameters, on the other hand, are respectively spaced at their outer peripheries from the inner surface of the tubular member 17 and are fluidtight at their inner peripheries with the support pin 27. Consequently, the cooling medium flows around outer peripheries of the element 14 and through the inner peripheries of the elements 15.

It will be seen that with the axially folded configuration of the path of the cooling medium defined by successively spaced resistive elements 14 and 15 of alternately smaller and greater inner and outer peripheries supported on respective spacers 28 and 29, almost entire surfaces of the resistive elements may be exposed to the cooling medium, thereby achieving extremely efficient cooling. Also, as the process of winding the resistive element is simple and the assemblage of the entire resistive elements requires merely positioning them successively in an alternate fashion one over another on the supporting rod and electrically connecting them in series, the manufacture of the braking resistor as a whole is very simple. Further, as the voltage applied across the braker will be distributed uniformly over the entire resistive elements, the voltage-withstanding characteristic is excellent.

In the foregoing embodiment of the braking resistor, the cooling medium flows from the bottom upwards within the tubular member 17, is discharged from the member through an exit 35 provided on top thereof, and passing through the return path 19 formed between the casing 11 and the tubular member 17 reenters the tubular member 17 through entrance 36 formed at the lower end of the member 17. Thus, natural connection is utilized for cooling the resistive elements. When the pressure of the medium within the casing 11 accidentally increases, the valve 23 is actuated to release the medium out of the casing 11.

Further, when achieving the effective cooling of the resistive element assembly 18 by the forced circulation, a pump 38 and a condenser 39 may be externally connected between the flow path 19 and the axially folded path within the tubular member 17 through piping 37, thereby the effective cooling of the resistive element assembly 18 may also be attained. As the cooling medium may be used besides the air such gases as sulfur hexafluoride, nitrogen and so forth or the medium may be a liquid such as water or oil.

Figure 6:
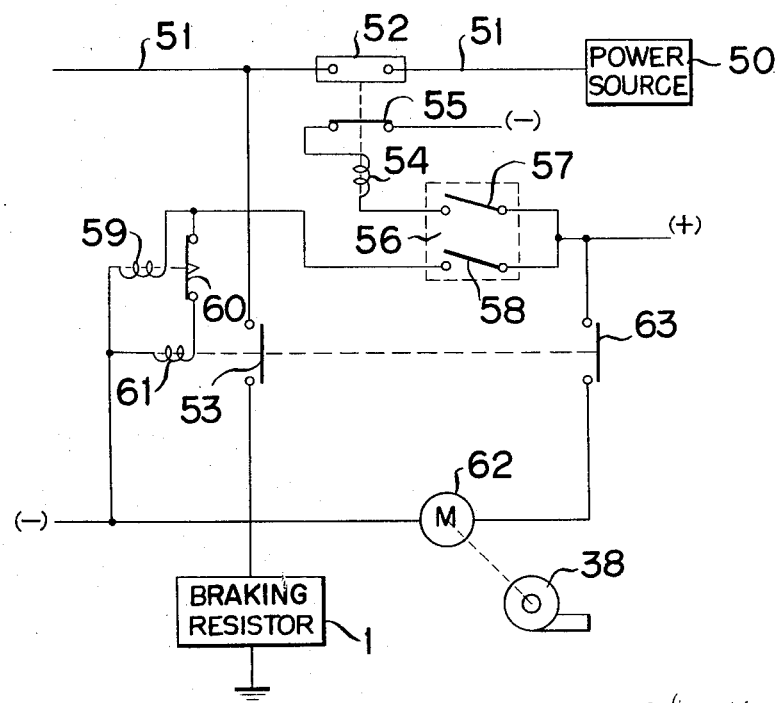
FIG. 6 is a circuit diagram showing the circuit for controlling the braking resistor for preventing the reclosing surge.

In the following is described with reference to FIG. 6 a control circuit having the braking resistor, which has been described hereinabove, to prevent the reclosing surge at the time of reclosing the associated power system upon elimination of a fault in the system. The braking resistor 1 according to this invention is arranged to be connected to transmission mains 51 in connection with a power source 50 through a first normally open contact 53 of a relay connected to one of the terminals of a circuit breaker inserted in a predetermined point of the transmission mains 51 remote from the source 50. A closing coil 54 for said circuit breaker 52 is connected across an external circuit control DC source, not shown, through a normally closed contact 55 connected to the negative terminal of the DC source and driven by the closing coil 54 and through one contact 57 of a control switch connectable to the positive terminal of the DC source. The other contact 58 of the control switch 56 is connectable at one end to the positive terminal of the DC source directly and at the other end to the negative terminal of the source through a parallel arrangement having one branch consisting of a coil 59 of a timer switch and the other branch consisting of a contact 60 of the timer switch and a serially connected coil 61 of the previously mentioned relay. For instance the field winding of a motor 62 for driving the previously described pump 38 may be connected between the terminals of the DC source through a second normally open contact 63 of the aforesaid relay.

In operation, when the circuit breaker 52 is tripped by a tripping controller which is to be described hereinafter owing to a fault occurred in the transmission mains 51, the control switch 56 is actuated by a reclosing command produced upon the tripping of the circuit breaker 52. The control switch 56 is constructed such that there is a time lag between the closures of contacts 57 and 58 produced by the action of, for instance, a drum or cam. This construction is necessary in that at the time the circuit breaker 52 is reclosed the contact 53 should already be closed. Accordingly, when the control switch 56 is actuated the contact 58 is closed at first to energize the relay coil 61 so as to close the first normally open contact 53, thereby connecting the braking resistor 1 to the transmission mains 51.

Afterwards, the contact 58 is closed to energize the closing coil 54, thus reclosing the circuit breaker 52 while at the same time opening the normally closed contact 55. As a result, the coil 54 is deenergized and the circuit breaker 52 maintains the reclosed state. A transient surge voltage generated upon reclosing the circuit breaker 52 will be directed across the braking resistor 1 and taken away effectively instead of being transmitted through the transmission mains 51.

Upon the closure of the contact 58 the coil 59 of the timer switch is also energized so as to open its contact 60 after an appreciable time, that is, at least after the surge voltage induced upon the reclosing of the circuit breaker following the closing of the contact 53 has been completely absorbed by the braking resistor 1. When the contact 60 is opened the coil 61 is deenergized so as to open the contacts 53, thereby isolating the braking resistor 1 from the transmission mains 51.

Figure 5:
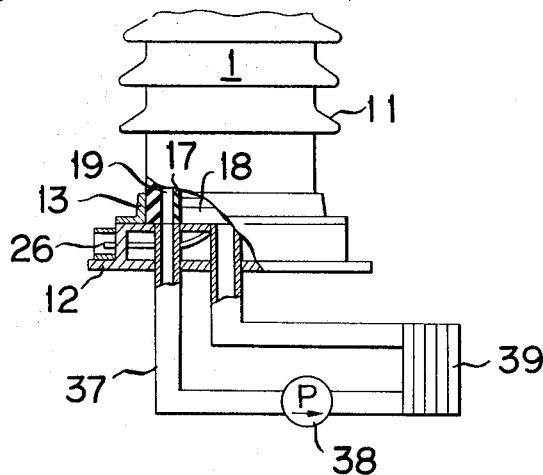
FIG. 5 shows a portion of another embodiment of the braking resistor according to the invention.

At the same time with the closure of the contact 53 when the coil 61 is energized upon the closing of the contact 58, the contact 63 is also closed to start the motor 62 to drive the pump 38 for achieving the forced cooling of the braking resistor 1 as illustrated in FIG. 5. The motor 62 is stopped as its DC power supply is cut therefrom concurrently with the isolation of the braking resistor from the transmission mains 51 by the opening of the contact 63 which is also simultaneous with the opening of the contact 53.

Figure 7:
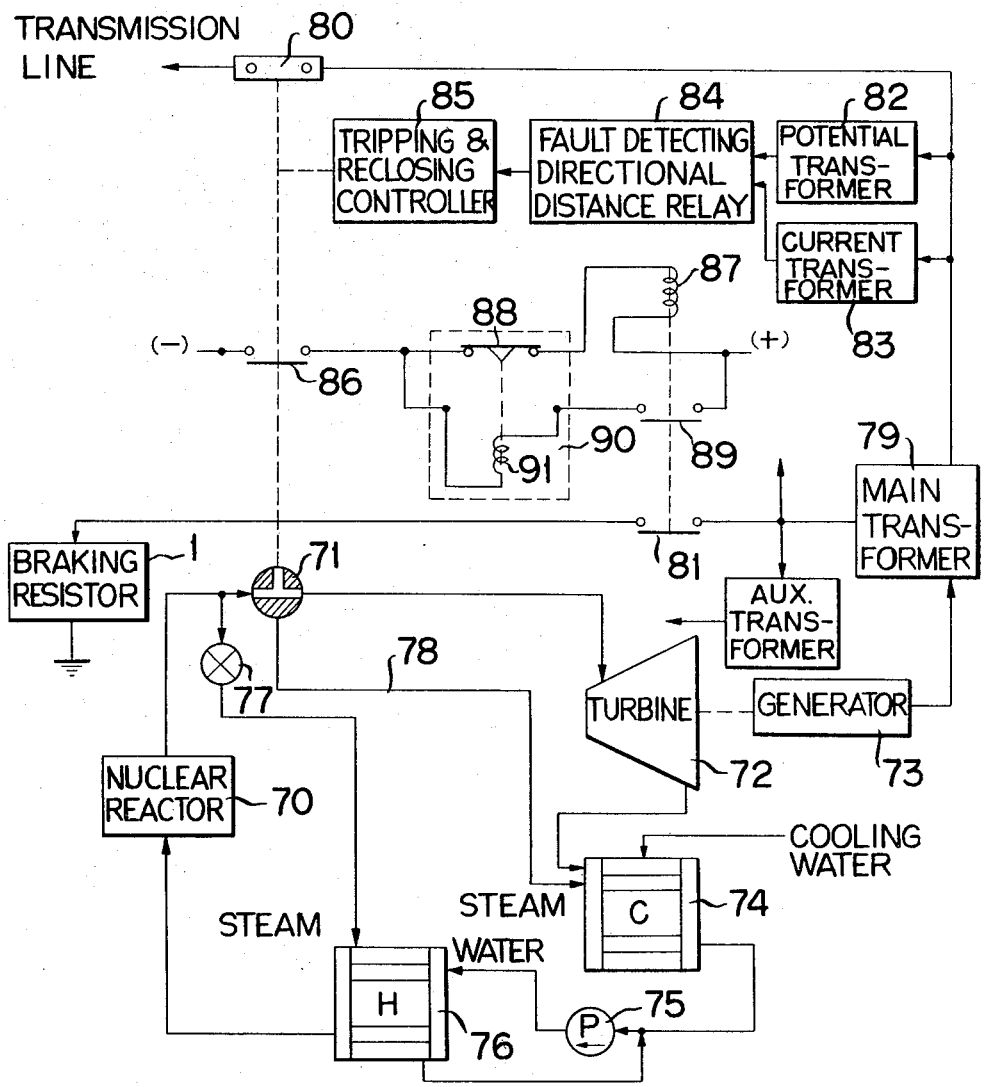
FIG. 7 is a block diagram showing a control circuit arrangement in case the braking resistor according to this invention is employed in the electric power system associated with the nuclear power generation.

FIG. 7 illustrates the way of applying the braking resistor according to this invention in the stabilization of an electric power system connected with the nuclear power generation.

The steam produced by a nuclear reactor 70 is brought through a three-way valve 71 into a turbine 72 to drive it so as to operate a generator 73 associated therewith. The steam exhausted from the turbine 72 is led to a condenser 74 where it is cooled down into water which is then conducted through a pump 75 into a heater 76. The water preheated by the heater 76 is again supplied to the reactor 70. The heat source for the heater 76 is the steam from the reactor 70 supplied through a valve 77 into the heater 76. The recovered water from the heater 76 is returned to the inlet of the pump 75. Although in normal state the steam from the reactor 70 is supplied to the turbine 72 through the three-way valve 71, it becomes directed to the condenser 74 through a duct 78 by the action of the three-way valve at the time when a fault would take place in the power system.

The power generated by the generator 73 is normally fed to the primary side terminals of a main transformer 79. The secondary side terminals of the transformer 79 is connected to the transmission line having a circuit breaker 80, and the tertiary terminal of the transformer 79 is connected to a braking resistor 1 through a normally open contact 81. The detection of a fault and the measurement of the directed distance from the point of occurrence of the fault are undertaken by a potential transformer 82 and a current transformer 83 respectively connected to the secondary side terminals of the main transformer 79, whereby a fault-detecting and directional-distance-measuring relay 84 responds to the occurrence of the fault to drive a tripping and reclosing controller 85 so as to trip a circuit breaker 80 and at the same time closing a normally open contact 86 which forms a series circuit together with a relay coil 87, a normally closed contact 88 thereof and a controlling DC source. Between the positive terminal of the DC source and the contact 86 are also inserted a normally open contact 89 and a timer relay 90 connected in series. The timer relay 90 consists of a coil 91 and said normally closed contact 88, and is constructed such that when the coil 91 is energized the contact 88 opens a predetermined interval of time after the energization of the coil 91.

When the normally open contact 86 is closed as a result of the detection of a fault the relay coil 87 is energized to close normally open contacts 81 and 89, thereby connecting the braking resistor 1 to the tertiary side terminals of the main transformer 79, while at the same time energizing the timer relay coil 91. Concurrently with the closure of the contact 86 the three-way valve 71 is actuated by the controller 85, whereby the steam from the reactor 70 becomes to be supplied to the condenser 74 through the duct 78 instead of being supplied to the turbine 72. With the arrangement just described, the operation of the turbine 72 may be temporarily stopped at the time of occurrence of a fault without stopping the reactor 70 and the operation of the turbine 72 may be resumed immediately after the elimination of the fault, whereby the electric power system may always be held in the stabilized state.

What is claimed is:

1. An apparatus adopted to be temporarily connected to a power system to promote the transient stability of the system comprising a plurality of resistance elements each comprising a strip or wire of a conducting material wound in the form of a spiral disc, said resistive elements belonging to at least two groups distinct from one another with respect to the inner and outer diameters, being alternately positioned in concentrically spaced relationship one above another, and being electrically connected in series with one another, means for sealing the inner peripheries of the resistance elements which have smaller inner and outer diameters, and a tubular member of an insulating material sealing the outer peripheries of the resistance elements which have greater inner and outer diameters, the inner wall surfaces of said tubular member, the axially opposed surfaces of said resistance elements and the surfaces of said means together defining an axially folded path for a dielectric cooling medium.

2. An apparatus according to claim 1 in which means is provided for forcibly circulating said cooling medium through said axially folded path during an interval of time from the instant of occurrence of a fault in the power system until the elimination of the fault.

3. An apparatus according to claim 1 in which said resistance members are supported on respective insulating spacer members, whereby said tubular member, said resistance elements and said insulating spacer members together define an axially folded path for said cooling medium.

4. An apparatus according to claim 1 in which said insulating tubular member is disposed within an insulating casing such that a return path for the circulating cooling medium is defined by the inner wall surfaces of said casing and the outer wall surfaces of said tubular member.

5. An apparatus according to claim 1 in which said dielectric cooling medium is an inert gas.

6. An apparatus according to claim 1 in which said dielectric cooling medium is a liquid.

7. An apparatus according to claim 1 in which said dielectric cooling medium is an air.

8. An apparatus according to claim 5 in which said inert gas is sulfur hexafluoride gas.

9. An apparatus according to claim 5 in which said inert gas is nitrogen gas.

10. An apparatus according to claim 6 in which said liquid is an insulating and cooling oil.

11. An apparatus according to claim 6 in which said liquid is water.

* * * * *